(12) United States Patent
Wright

(10) Patent No.: US 9,958,173 B1
(45) Date of Patent: May 1, 2018

(54) SOLAR POWERED ROOF VENTILATION SYSTEM

(75) Inventor: Jason Eric Wright, Gaston, OR (US)

(73) Assignee: NORTHWEST RENEWABLE ENERGY CORP., Gaston, OR (US)

( * ) Notice: Subject to any disclaimer, the term of this patent is extended or adjusted under 35 U.S.C. 154(b) by 1081 days.

(21) Appl. No.: 13/573,359

(22) Filed: Sep. 10, 2012

Related U.S. Application Data

(60) Provisional application No. 61/532,291, filed on Sep. 8, 2011.

(51) Int. Cl.
*F24F 7/007* (2006.01)

(52) U.S. Cl.
CPC .................... *F24F 7/007* (2013.01)

(58) Field of Classification Search
CPC ....................................... F24F 7/007
USPC ............................................ 454/258
See application file for complete search history.

(56) References Cited

U.S. PATENT DOCUMENTS

| | | | | |
|---|---|---|---|---|
| 3,409,043 A * | 11/1968 | Warren, Jr. | ............ | F24F 3/0522 137/607 |
| 3,537,378 A * | 11/1970 | Daly | .............. | 454/337 |
| 4,006,856 A * | 2/1977 | Nilsson | ............ | 126/591 |
| 4,103,825 A * | 8/1978 | Zornig | ............. | 126/632 |
| 4,304,174 A * | 12/1981 | Hickson | .............. | A47H 23/06 160/126 |
| 4,375,183 A * | 3/1983 | Lynch | ..................... | F24F 13/15 137/601.09 |
| 4,432,273 A | 2/1984 | Devitt | | |
| 4,605,160 A * | 8/1986 | Day | .......................... | F24F 11/08 137/111 |
| 4,609,346 A * | 9/1986 | Siccardi | ................. | A01G 9/246 34/230 |
| 4,737,103 A * | 4/1988 | Siccardi | ................. | A01G 9/246 236/15 BD |
| 4,873,873 A * | 10/1989 | Day | .......................... | G01F 1/22 137/486 |
| 4,899,645 A | 2/1990 | Wolfe et al. | | |
| 4,939,986 A | 7/1990 | Turner | | |
| 5,078,047 A | 1/1992 | Wimberly | | |
| 5,081,912 A * | 1/1992 | Clenet | ........................... | 454/136 |
| 5,131,888 A * | 7/1992 | Adkins, II | .................... | 454/343 |
| 5,324,229 A * | 6/1994 | Weisbecker | ............ | F24F 13/04 236/49.3 |
| 5,346,127 A * | 9/1994 | Creighton | ............ | G05D 23/138 165/248 |
| 5,462,657 A * | 10/1995 | Rizk | ...................... | B01F 3/0473 210/170.06 |

(Continued)

FOREIGN PATENT DOCUMENTS

| | | |
|---|---|---|
| CN | 201688520 U | 12/2010 |
| CN | 202002252 U | 10/2011 |

(Continued)

*Primary Examiner* — Steven B McAllister
*Assistant Examiner* — Samantha Miller
(74) *Attorney, Agent, or Firm* — Marger Johnson

(57) ABSTRACT

Embodiments of the invention are directed to a solar-powered ventilation system for mounting to a building. Through the use of internal dampers and destratification intake doors, the system is able to cool the inside of buildings by way of hot-air venting or cold-air induction methods. Further, the system may also be configured in a combinatory manner, allowing the building to be cooled by the simultaneous use of hot-air venting and cold-air induction methods.

16 Claims, 10 Drawing Sheets

(56) References Cited

U.S. PATENT DOCUMENTS

| | | | | |
|---|---|---|---|---|
| 5,620,368 | A * | 4/1997 | Bates et al. | 454/186 |
| 5,672,101 | A | 9/1997 | Thomas | |
| 6,147,295 | A * | 11/2000 | Mimura et al. | 136/246 |
| 6,220,956 | B1 * | 4/2001 | Kilian et al. | 454/239 |
| 6,468,054 | B1 * | 10/2002 | Anthony et al. | 417/360 |
| 7,507,151 | B1 | 3/2009 | Parker et al. | |
| 8,047,905 | B2 * | 11/2011 | Everett et al. | 454/187 |
| 8,123,142 | B2 | 2/2012 | Cislo | |
| 8,152,608 | B1 | 4/2012 | Hamby | |
| 8,221,200 | B2 * | 7/2012 | Oaten | 454/186 |
| 8,285,127 | B2 * | 10/2012 | Mulder | F24D 5/02 392/347 |
| 8,364,318 | B2 * | 1/2013 | Grabinger | F24F 11/0001 454/256 |
| 8,609,519 | B2 * | 12/2013 | Lee | C23C 16/04 257/E21.09 |
| 8,672,733 | B2 * | 3/2014 | Chen | F04D 27/004 236/49.3 |
| 8,733,280 | B2 * | 5/2014 | Yap | C23C 16/45565 118/715 |
| 8,776,780 | B2 * | 7/2014 | Roseberry | 126/563 |
| 8,827,779 | B2 * | 9/2014 | Hollick | 454/185 |
| 8,900,364 | B2 * | 12/2014 | Wright | C23C 16/4412 118/715 |
| 8,918,218 | B2 * | 12/2014 | Grabinger | F24F 11/0001 236/49.3 |
| 9,027,289 | B1 | 5/2015 | Burtt | 52/173.3 |
| 9,097,432 | B2 * | 8/2015 | Kreft | F24F 3/14 |
| 9,255,720 | B2 * | 2/2016 | Thomle | F24F 11/006 |
| 9,300,581 | B1 * | 3/2016 | Hui | H04L 45/74 |
| 9,500,382 | B2 * | 11/2016 | Grabinger | F24F 3/044 |
| 9,765,986 | B2 * | 9/2017 | Thomle | F24F 11/006 |
| 2002/0104807 | A1 * | 8/2002 | Keeton, Jr. | B01F 3/04113 210/620 |
| 2004/0176021 | A1 * | 9/2004 | Mills | 454/143 |
| 2004/0209567 | A1 * | 10/2004 | Schmitz | 454/186 |
| 2005/0191957 | A1 * | 9/2005 | Demetry et al. | 454/341 |
| 2007/0072541 | A1 * | 3/2007 | Daniels et al. | 454/365 |
| 2007/0130850 | A1 * | 6/2007 | Miekka | 52/198 |
| 2007/0243820 | A1 | 10/2007 | O'Hagin | |
| 2008/0113612 | A1 * | 5/2008 | Chich et al. | 454/341 |
| 2009/0194095 | A1 * | 8/2009 | Fairstein | F24J 2/16 126/652 |
| 2009/0242653 | A1 * | 10/2009 | Needham | 237/50 |
| 2010/0202932 | A1 * | 8/2010 | Danville | A61L 9/205 422/121 |
| 2010/0300645 | A1 * | 12/2010 | Glover | 165/48.1 |
| 2010/0304660 | A1 | 12/2010 | Boehling et al. | |
| 2010/0330898 | A1 * | 12/2010 | Daniels | 454/365 |
| 2011/0021133 | A1 * | 1/2011 | Zwern | 454/338 |
| 2011/0021134 | A1 * | 1/2011 | Zwern | 454/343 |
| 2011/0124280 | A1 * | 5/2011 | Railkar et al. | 454/341 |
| 2011/0217194 | A1 | 9/2011 | Randall | |
| 2011/0223850 | A1 * | 9/2011 | Narayanamurthy et al. | 454/239 |
| 2011/0269388 | A1 * | 11/2011 | Meulenbelt | 454/76 |
| 2011/0290234 | A1 | 12/2011 | Cheng | |
| 2012/0015597 | A1 | 1/2012 | Foreman et al. | |
| 2012/0045983 | A1 * | 2/2012 | Eskola, III | 454/341 |
| 2012/0149291 | A1 * | 6/2012 | Roderick et al. | 454/251 |
| 2012/0178357 | A1 * | 7/2012 | Rheaume | 454/343 |
| 2012/0252348 | A1 * | 10/2012 | Rheaume | 454/343 |
| 2012/0261091 | A1 * | 10/2012 | Krecke | 165/45 |
| 2012/0302153 | A1 * | 11/2012 | Macioch et al. | 454/341 |
| 2012/0302154 | A1 * | 11/2012 | Bushey | 454/343 |
| 2013/0019747 | A1 * | 1/2013 | Innes | 95/23 |
| 2013/0040553 | A1 * | 2/2013 | Potter | 454/341 |
| 2013/0074428 | A1 * | 3/2013 | Allen et al. | 52/173.3 |
| 2013/0292858 | A1 * | 11/2013 | Keeton, Jr. | B01F 13/1025 261/120 |

FOREIGN PATENT DOCUMENTS

| | | |
|---|---|---|
| CN | 202048641 U | 11/2011 |
| CN | 202074650 U | 12/2011 |
| EP | 0089214 A1 | 9/1983 |
| EP | 1785675 A1 | 5/2007 |
| JP | 6131835 A | 2/1986 |
| WO | 2011091504 A1 | 8/2011 |

* cited by examiner

SOLAR POWERED ROOF VENTILATION SYSTEM

CROSS-REFERENCE TO RELATED APPLICATIONS

This application is a non-provisional of and claims benefit from U.S. Provisional application 61/532,291, filed Sep. 8, 2011, entitled SOLAR POWERED ROOFTOP VENTILATOR FOR COMMERCIAL, INDUSTRIAL, AGRICULTURAL APPLICATIONS, the contents of which are incorporated by reference herein.

FIELD OF THE INVENTION

This disclosure is directed to rooftop ventilators, and, more particularly, to a rooftop ventilator that is solar powered and can be used in non-conditioned or conditioned space.

BACKGROUND

Buildings trap heat inside of them. This is especially true for a business, factory, storehouse or warehouse that operates heat generating equipment inside the building. Although many or most office buildings are air-conditioned spaces, it is generally too expensive to run air-conditioning units in factories, warehouses, storehouses, prisons, and other large buildings due to the high cost of conditioning the space.

Air-moving fans are a lower-cost option to cool buildings, even though they do not cool as much as typical air conditioning. Typically fans ventilate hot air from the building, which causes cool air to be drawn in, such as through open windows. In other modes fans may bring cool air directly in the building. Many businesses do not install ventilation fans, however, because electrical power to power the operation of the fans must also be installed, in addition to the ventilation fans themselves. In addition to the expense, running electrical power generally requires acquiring installation permits, which in turn requires inspections, which further adds to the cost of installation. Therefore, due to either the high cost of conditioning the air of large buildings, or the high cost of installing fans and their accompanying power, many large buildings have no or insufficient cooling ability, and no or insufficient destratification remedies.

Embodiments of the invention address these and other limitations of the prior art.

SUMMARY OF THE INVENTION

Embodiment of the invention are directed to a solar-powered roof-mounted ventilation system. A solar panel creates electricity from sunlight to drive a motor-driven, variable-speed, reversible fan for air ventilation of a building. In a standard mode, the ventilator can exhaust hot air from a building or introduce cool outside air into a building, depending on the direction of the air movement due to the fan. In a destratification or thermal balancing mode, a set of dampers is closed to prevent any outside air exchange, while internal baffles are opened in an extension that protrudes through the roof and inside the building. Air is propelled in either direction through the open destratification doors by the reversible fan to promote air movement within the closed building. In a combination ventilation/destratification mode, an upper damper may be partially opened to allow a regulated amount of outside air to be introduced into a building that is being currently destratified. Sensors allow for control to be based on temperature, humidity and/or other data. The device may also include a rechargeable battery for time-delayed operation, such as operation during night hours when the cooling effect may be more pronounced. Multiple units may operate in concert and/or in tandem. In addition, the units may be used in conjunction with existing HVAC units in a building.

DETAILED DESCRIPTION

Figure 1:
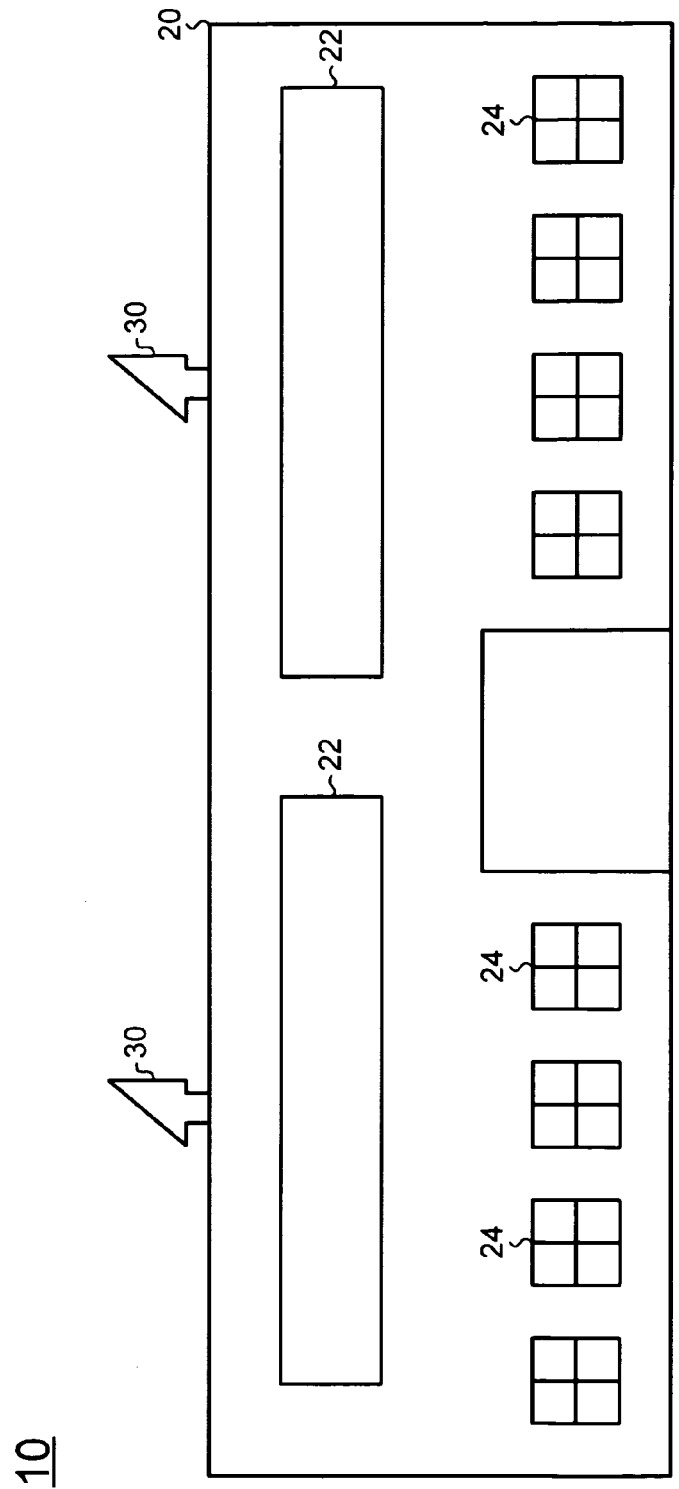
FIG. 1 is a front view of a building illustrating an operating environment for the ventilation system according to embodiments.

FIG. 1 is a front view of a building illustrating an operating environment for the ventilation system according to embodiments. A building 20 is shown having two self-contained solar-powered roof ventilation systems 30 according to embodiments of the invention mounted thereon. As described below, these ventilation systems 30 allow the building 20 to be cooled by drawing hot air from near the inside ceiling and ventilating it out into the atmosphere. The ventilation systems 30 include air-moving air propellers, or fans, which, by virtue of their operation, create areas of lower pressure near the ventilation units 30. Vent windows 22 or even view windows 24 may be opened so that fresh air may be drawn from the outside and move toward the lower pressure areas caused by the ventilation units 30. In the northern hemisphere the sun shines most directly on walls and windows that have southern exposure. Therefore, opening windows on the opposite side of the building, i.e., the north side, allows the building 20 to draw the coolest air available to cool the building. The ventilation systems 30 also work in reverse, that is, they are able to draw cool air from outside and force it into the building. This may be beneficial at night. Even further, as described below, the ventilation systems may provide destratification, that is a de-layering of air within a building. Buildings having stagnant air generate stratification of air levels having a thermal gradient, with cooler air on the bottom layers and warmer air on top, near the ceiling. Embodiments of the invention address this problem, as described in detail below.

Figure 2:
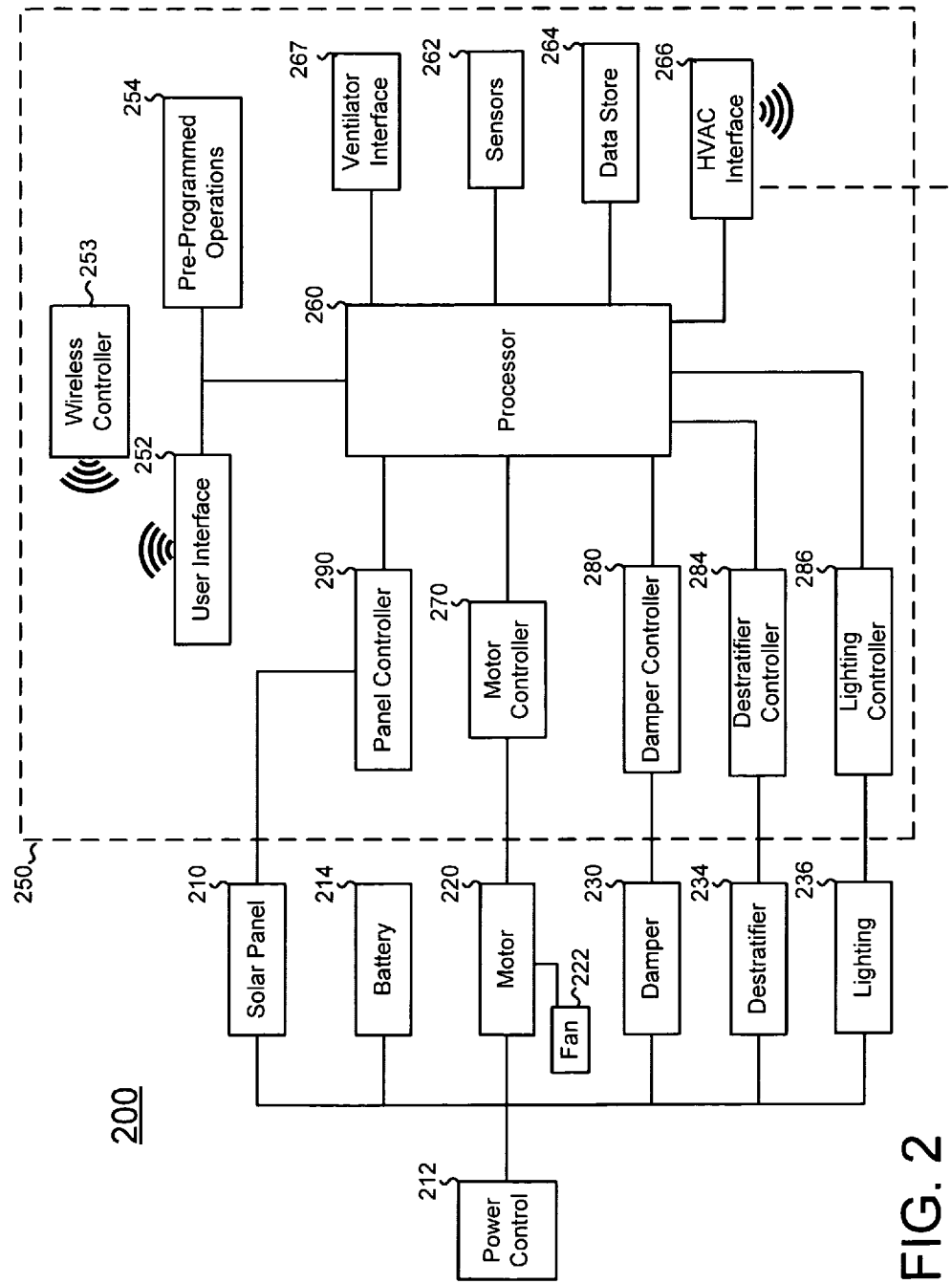
FIG. 2 is a functional block diagram of example components of a ventilation system according to embodiments of the invention.

FIG. 2 is a functional block diagram of example components of a ventilation system 200 according to embodiments of the invention. Power for the ventilation system 200 is generated by a solar panel 210. The solar panel 210 generates dc (direct current) voltage from sunlight at a sufficient amperage to drive the ventilation system 200. In one embodiment the solar panel 210 generates at least 200-250 watts, but may be sized to the particular ventilation system 200. Larger panels normally generate higher power than smaller panels, but have higher costs. As described below, the panel 210 is mounted to the ventilation system at an advantageous angle, depending on a latitude of where the ventilation system 200 is installed. The angle of the panel 210 may be fixed or may be able to be adjustable depending on the implementation. Typically, however, the panel 210 is mounted on a bracket secured to a housing of the ventilation system 200. An example panel may be Sunmodule SW 250 mono available from SOLARWORLD of Hillsboro, Oreg.

A power control unit 212 receives output from the solar panel 210 and converts it to usable energy, depending on the requirements of the ventilation system 200. The power control unit 212 may include a voltage regular to limit the maximum voltage. In one embodiment the power control unit 212 limits the voltage to 36 volts. Although in a preferred embodiment the ventilation system 200 uses direct current, if alternating current were used then the power control unit 212 could include a power inverter for producing the alternating current from the solar panel 210. Line conditioners may also be used to ensure clean power is available to the ventilation system 200.

A storage battery 214 may be included in some embodiments of the ventilation system 200. The battery 214 stores power. Because the ventilation system 200 is a solar powered device, without stored power it would be inoperable when there is no or insufficient light available to the solar panel 210. For example, the ventilation system 200 would be inoperable at night. When present in the ventilation system 200, the battery 214 is charged when the solar panel 210 produces energy. Depending on the size of the solar panel 210 and the intensity of the sunlight, the power generating capacity of the solar panel may be larger than instant requirements of the ventilation system 200. During such periods, the excess generated power may be stored in the battery 214, and the ventilation system 200 may use the energy stored in the battery 214 when the solar panel 210 is not producing enough power. In embodiments that include the battery 214, the power control unit 212 may additional include a charge regulator. In addition, when the solar panel 210 is generating more power than is used by the ventilation system 200, it may provide the power to be used elsewhere in the building. In some embodiments an inverter may be used to put excess power on the grid from one or more tied ventilation systems, which may result in offsetting electrical costs of running the building itself or the equipment inside. In other embodiments the excess energy may be used for lighting, such as by suspending a lighting cable from the ventilation system down through the ceiling and over a workspace that may benefit from additional lighting. For instance, LED (Light Emitting Diode) lighting is a type of lighting that has low power requirements and may work well with power generated by the solar panel 210. In those embodiments an LED fixture could provide additional light for interior building illumination.

A motor 220 may be coupled to the battery 214, power controller 212, and/or the solar panel 210, depending on a configuration of ventilation system 200. The motor 220 drives a propeller or fan 222. The fan 222 moves air through the ventilation system 200 to remove heat from, to cool, or to recirculate air within a building, as described in detail below. The motor 220 may be a dc or ac motor depending on the specifications of the ventilation system 200. For example, the motor 220 may be a 36v dc variable speed motor that can run in either direction. The variable speed control may be continuous between 0 and 100% of maximum, or may step in pre-determined increments, depending on the application. Having a bi-directional motor 220 allows the ventilation system 200 to either draw air from a building or pull air into the building depending on the direction of the motor.

A thermal fuse may be installed in the ventilation system 200, such as between the fan 222 and motor 220. Such a fuse separates power from the fan and prohibits operation in case of thermal overload or, even more importantly, in case of structure fire. Having such a thermal fuse prevents additional oxygen to be added to the fire through the ventilation system. In operation, the thermal fuse melts or otherwise stops electricity from passing to the fan 222 when the thermal fuse reaches the activation point. Typically this activation point is set to a temperature so that the thermal fuse will activate during a fire, and automatically shut down the ventilating operation.

A damper 230 may be included in the ventilation system 200. As described in detail below, the damper 230 controls airflow through the main body of the ventilation system 200. The damper 230 may be set in a fully closed, fully open, or partially open position, and is preferably automatically controlled by a damper controller. In alternate embodiments the damper may be manually controlled, or operate automatically when the ventilation system 200 is in operation, for example automatically closing during times when the ventilation system is off, and automatically opening during times when it is running. The damper 230 may also be referred to herein as a set of baffles.

A destratifier 234 may be included in the ventilation system. The destratifier 234 controls a destratification operation by allowing air inside the building to be circulated while preventing air from passing between the building and the outside. In other embodiments a partial destratification operation is possible, as described in detail below.

Lighting 236, such as low-power or LED lighting may be part of the ventilation system as well, taking advantage of the solar power generated by the solar panel 210.

The ventilation system 200 may also include a control system 250 used to control operation of the system. The control system 250 may be powered from the solar panel 210 and coupled to the power controller 212 or other appropriate power connection. The control system may include a processor 260 that controls operation of the ventilation system 200. A user interface 252 allows an operator to control operation of the ventilation system 200, such as by turning it on or off, controlling the direction of the ventilation, controlling speed of the motor 220, and controlling a position of the damper 230. The user interface may also include an ability to control the lighting 236. The user interface 252 may take many forms. For instance the user interface 252 may be a simple mechanical interface having an on/off switch, motor direction switch, and speed control. In other embodiments the user interface 252 may present information about the ventilation system 200 to the operator. For example the user interface may report back an instant speed of the fan. If sensors or stored data is included in the ventilation system 200, described below, the user interface 252 may report any information available to the ventilation system 200. The user interface 252 may show information in real-time, or may be used to review historical information of ventilation system 200 operation, as described below. The user interface 252 may also be used to control lighting generated by the device, as described above. For instance the user interface may have an on/off switch or an intensity control for the light. The user interface may include a remote controller 253 that may couple through a wired or wireless connection to the user interface 252 and/or to the processor 260. Any operation by the user interface may also be viewed or controlled by the remote controller 253. For example the remote controller 253 may be mounted on a wall in a convenient location. In some cases the remote controller may be connected to line voltage, or include a line voltage sensor so that it could generate a signal if the line voltage dropped below a threshold, such as when the building lost power. In such a case the remote controller 253 could generate a signal that is received by the user interface 252, and cause the lighting system 236 to activate. In such a case the ventilation device may also operate to provide emergency lighting. In another example the remote controller 253 may be a program operating on a portable computer, such as an iPAD or a smartphone running an application, and may be used to control any function described above or below.

A ventilator interface 267 is used to couple multiple ventilator systems to one another so that they may be operated together, or in conjunction with one another. For example, consider a building that has four ventilators all coupled to one another. As one portion of the building is heating, the ventilator closest to the hot portion of the building may begin ventilating at a 50% of full vent level, and the next closest ventilator may operate at 25% full vent level. As the building continues to heat, then the all of the ventilators operate at 25% while the ventilator closest to the hot area runs at 100%. One of the control systems 250 may assume a "master" role to control all of the other control systems, or there may be a separate master. In another mode of operation, a single control system may control all of the ventilators to operate in the same mode, at the same levels, at the same time. In yet other modes, a centralized control system uses all of the sensors and data from all of the systems, and controls all of the coupled ventilators individually for the most efficient operation.

Using the user interface 252, an operator may be able to select and run any number of pre-programmed operations 254. For example, two pre-programmed operations 254 may be stored, one to control operation for the day and another to control nighttime operation. The user would simply select which program to run, depending on the desired operation. For example, the fan 222 may vent during the day, but may draw during the night, so that cool air may be drawn into the building. Thus, the pre-programmed operations would control things such as motor direction, speed, baffle position, and destratification door position. The pre-programmed operations may also be automatically controlled based on time, for example. With additional information from sensors, described below, elaborate pre-programmed operations may be devised. For example, a program may be devised that causes the ventilation system 200 to operate only when the difference between inside and outside temperature exceeds 10 degrees F., except when the difference between inside and outside humidity is less than 15%, during which times the ventilation system operates when the difference between inside and outside temperature exceeds 5 degrees F.

Sensors 262, such as temperature and humidity sensors, may be coupled to the processor 260 for use by the ventilation system 200. Multiple sensors 262 may be used for temperature, for example multiple sensors in the building, and one or more temperature sensors within the ventilation system 200 itself. External temperature sensors that measure a temperature of the outside air may also be coupled to the processor 260 for use by the ventilation system 200. Similar sensors may be used for humidity. Other sensors may include atmospheric pressure, wind speed, instant power used by the building, etc. Sensors may be coupled to multiple ventilation systems 200 that may be part of a large installation for a building or complex. For example, with use of a CO2 sensor 262, the ventilation system 200 may trigger all connected ventilation systems to vent as much air from the building as possible when a threshold amount of CO2 is detected. Sensor 262 information may also be viewable or controllable from the user interface 252. A motion sensor 262 may be used to cause a lighting controller 286 to automatically turn on the lighting 236.

A data store 264 may record operation data, temperature data, humidity, or other data about the ventilation system 200 for use by the processor 260 or for a historical record. For instance the building temperature and external temperature may be stored at regular intervals for later recall. The data store 264 may additionally or instead store operational data such as motor speed, motor direction, generated power by the solar panel 210, etc., which may or may not be correlated to the stored temperatures. The data store 264 may include a real-time clock. Data analysis from data stored in the data store 264 may help a building manager develop an optimum cooling program for the building. Further, data from the data store 264 may be available to the user interface 252 to allow a user or operator to view historical data, such as in list or graphical form.

The processor 260 is also coupled to controllers, such as a motor controller 270, damper controller 280, destratifier controller 284, lighting controller 286, and solar panel controller 290. The controllers 270, 280, 284, 286, 290 are used to operate their respective devices. For example the motor controller 270 may vary a voltage supplied to the motor 220 to regulate the speed and direction of the motor, while the damper controller 280 may regulate a position of a motor or solenoid used to open and/or close the damper 230. The destratifier controller 284 controls the position of destratifier doors by controlling a small position motor or solenoid. The lighting controller 286 controls light operation. The solar panel controller 290 may control a pitch or a direction at which the solar panel 210 is facing. For example the panel controller 290 may cause the solar panel to track the sun for most effective power generation by controlling a small positional motor that causes either the panel itself or the entire ventilation system 200 to turn as the sun changes position across the sky.

The ventilation system 200 may be coupled to and used in conjunction with existing HVAC (Heating Ventilation and Cooling) equipment. The control system 250 may include an HVAC interface 266, which may be a wired or wireless interface. Through the interface, an existing HVAC system of a building may be used to control any function of the ventilation system 200. For example, the building HVAC system may first use one or all of the connected ventilation systems 200 to begin venting hot air. Later, when the building continues to heat, the HVAC system, through the HVAC interface 266, causes all of the connected ventilation systems 200 to operate at full venting capacity. If the building continues to get hotter, then the HVAC system may instruct all of the ventilation systems 200 to stop venting, close their associated dampers to prevent any air from exchanging between the building and the outside, and the HVAC system takes over conditioning the space, by air-conditioning the space. Even further, the HVAC system may then instruct the ventilation systems 200 to begin destratifying the air within the building, with no outside air exchanges, as described in detail below. Through the HVAC interface 266, the HVAC system of a building may control each of the ventilation systems 200 coupled to it to act together or in cooperation.

Components other than those illustrated in FIG. 2 may be used in combination with, in addition to, or instead of those illustrated in FIG. 2, depending on various implementations of the ventilation system 200.

Figure 3:
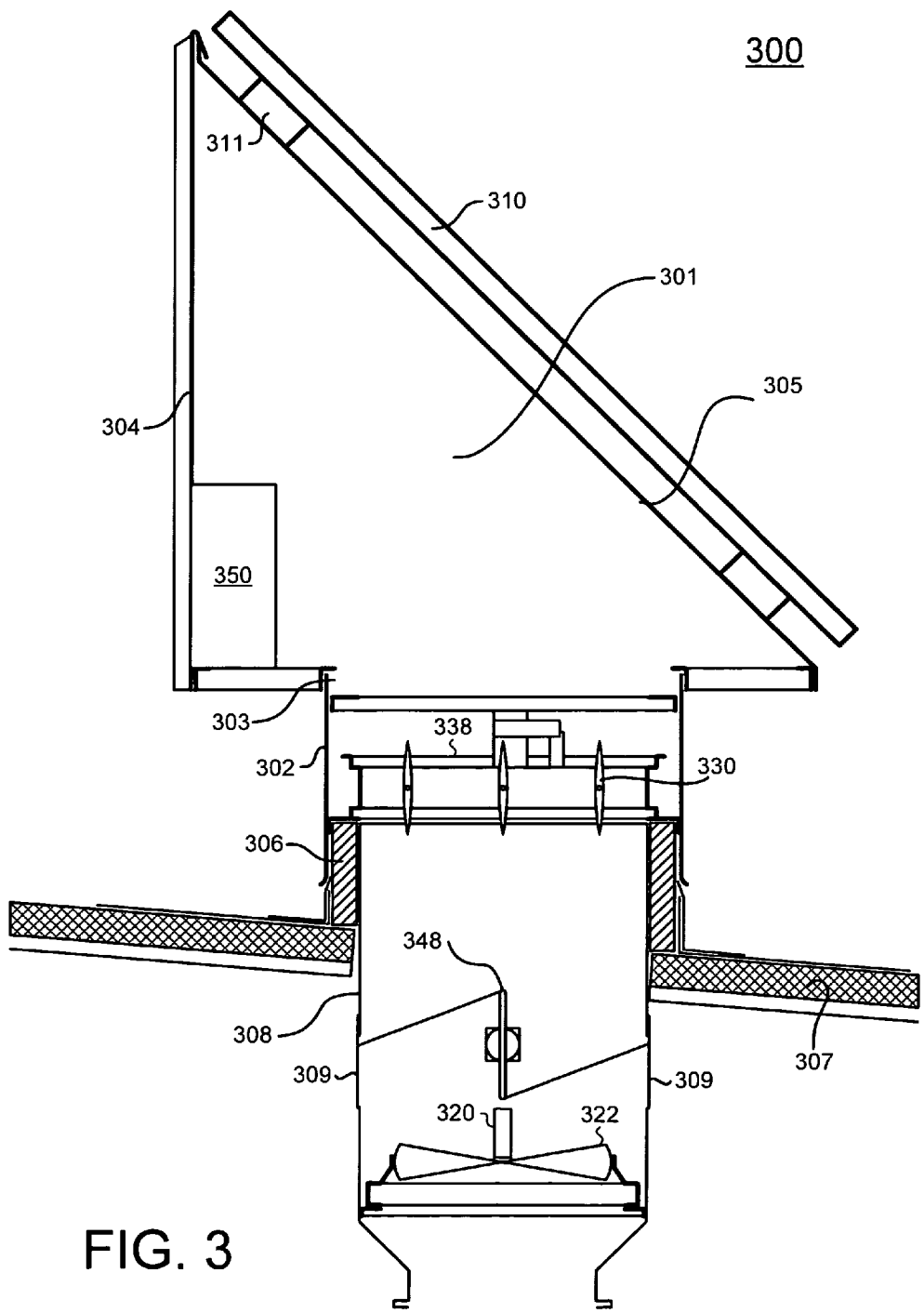
FIG. 3 is a cross-sectional diagram of a ventilation system according to embodiments of the invention.

FIG. 3 is a cross-sectional diagram of a ventilation system 300 according to embodiments of the invention. The ventilation system 300 includes a base housing 302 for mounting on a curb 306 attached to a building. The curb 306 sits on a roof 307, and provides physical support for the ventilation system 300. The base housing 302 may be adjustable in installations where the roof 307 is pitched so that a base of the ventilation system 300 sits approximately horizontally. In other embodiments it is possible for the ventilation system 300 to be mounted horizontally, such as out the side of a building, by modifying the housing 302 to suit the needs. The base housing 302 may come in various sizes depending on the air moving requirements of the installation, such as 24 inches, 36 inches, and 48 inches. Of course these sizes are only examples, and concepts of the invention are not limited based on the size. Generally the base housing 302 is square, but other shapes may also be used. Using a round base housing 302 may facilitate those embodiments that rotate to follow the sun.

A plenum enclosure 301 contains a control system 350, which may be the same or similar to the control system 250 described above with reference to FIG. 2. In general the plenum enclosure 301 is made of sheet metal or other appropriate material. The plenum enclosure 301 may be mounted on a frame 303, and include a generally vertical side 304, and a generally sloped face 305 between a top of the side 304 and the frame 303. In some embodiments the vertical side 304 may include or may itself be an access panel into the plenum 301 of the ventilation system 300. The plenum 301 may house any of the components of the ventilation system 300 so that they are contained within the system and protected from the elements. The plenum 301 may also contain a humidity evaporator or dessicant (not illustrated), which is used to dry air before it is brought into a building. The evaporator may include a drain and drain directly onto the roof, thereby preventing humid air from entering the building through the ventilation system 300.

Solar brackets 311 sit on the sloped face 305 and support a solar panel 310, which may be the same or similar to the solar panel 210 described above. In general, the brackets 311 hold the solar panel 310 in a position aligned with the sloping face 305 of the plenum enclosure 301. In some embodiments the sloping side is approximately forty-five degrees offset from the horizontal base 303, or other reference. Other degrees of slope are possible, such as between approximately 20-70 degrees. In some embodiments the solar brackets 311 may include slotted holes so that the solar panel may be manually adjusted for best exposure to the sun, for example depending on a latitude of the installation. In other embodiments the sloped face 305 or solar brackets 311 may support a positioning motor (not illustrated) that allows the panel controller 290 of FIG. 2 to position the panel 310 for optimum operation.

The base housing 302 extends through a venting hole in the roof 307 by way of a base extension 308 to give air inside the building a path through the ventilation system 300 and to the outside. A motor 320 and fan 322 are mounted within the base housing 302, or within the base extension 308, either above or below the level of the roof 307 depending on the particular installation. The fan 322 may further be enclosed by a shroud (not illustrated) to increase airflow. A set of dampers 330 control airflow through the base housing 302 as described in detail below. The dampers may be actuated by, for example, a damper actuator 338, which is controlled by the damper controller 280 of FIG. 2.

Within the base extension 308 is a set of destratification intake doors 309, the operation and purpose of which are described below with reference to FIGS. 5-8. The destratification doors 309 are controlled by a destratification actuator 348, which may be controlled by, for example, the destratifier controller 284 of FIG. 2.

The shape and size of the plenum enclosure 301, base housing 302, and base extension 308 may be sized to fit the particular needs of the ventilation system 300 without changing the operating principles of the ventilation system.

Operation of various embodiment of the invention are now described with reference to FIGS. 4-8.

Figure 4A:
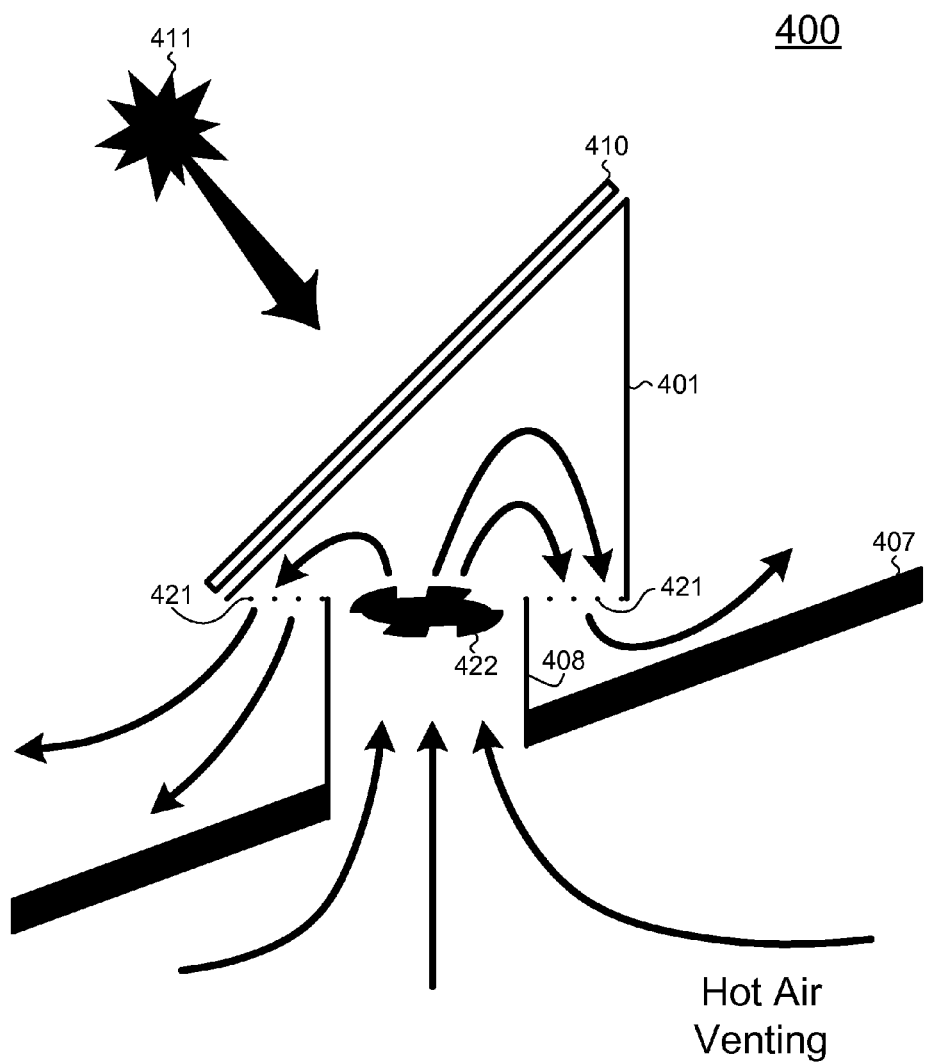
FIG. 4A is a diagram illustrating a heat ventilation operation of embodiments of the invention.

FIG. 4A is a diagram illustrating a basic heat ventilation operation of embodiments of the invention. In general, a ventilation system 400 sits on the roof 407 of a building and is used to move air between the inside of the building and outside.

The ventilation system 400 is powered by a solar array 410 that receives energy from the Sun 411, as described above. In general, the ventilation system 400 is positioned so that the solar array 410 faces a direction to maximize solar exposure and resultant power generation. In Northern Hemisphere installations, the solar array 410 generally faces south, while in Southern Hemisphere installations the solar array 410 generally faces north. Also, as described above, the ventilation system 400 may include a motor that can turn the solar array 410, or the entire ventilation system itself, to follow the sun for maximum energy generation.

In a building venting operation, a fan 422 draws hot air from within the building and causes it to move toward the plenum area 401. The plenum 401 is vented, for example at the bottom, through a series of vents 421, which allows the air be drawn from the building, moved through a base extension 408, and exhausted through the plenum vents 421. Additional detail of the vents 421 is given with reference to FIG. 9. To maximize the cooling effect of the exhausting hot air from the building, windows or other openings through which fresh air may be drawn are opened in the building, so as to allow the fresh air to enter the building as the hot air is venting. Generally it provides the greatest cooling effect to open windows or openings on the coolest side or sides of the building, such as the north side for buildings in the Northern Hemisphere, which are shaded throughout most of the day by the building itself.

Figure 4B:
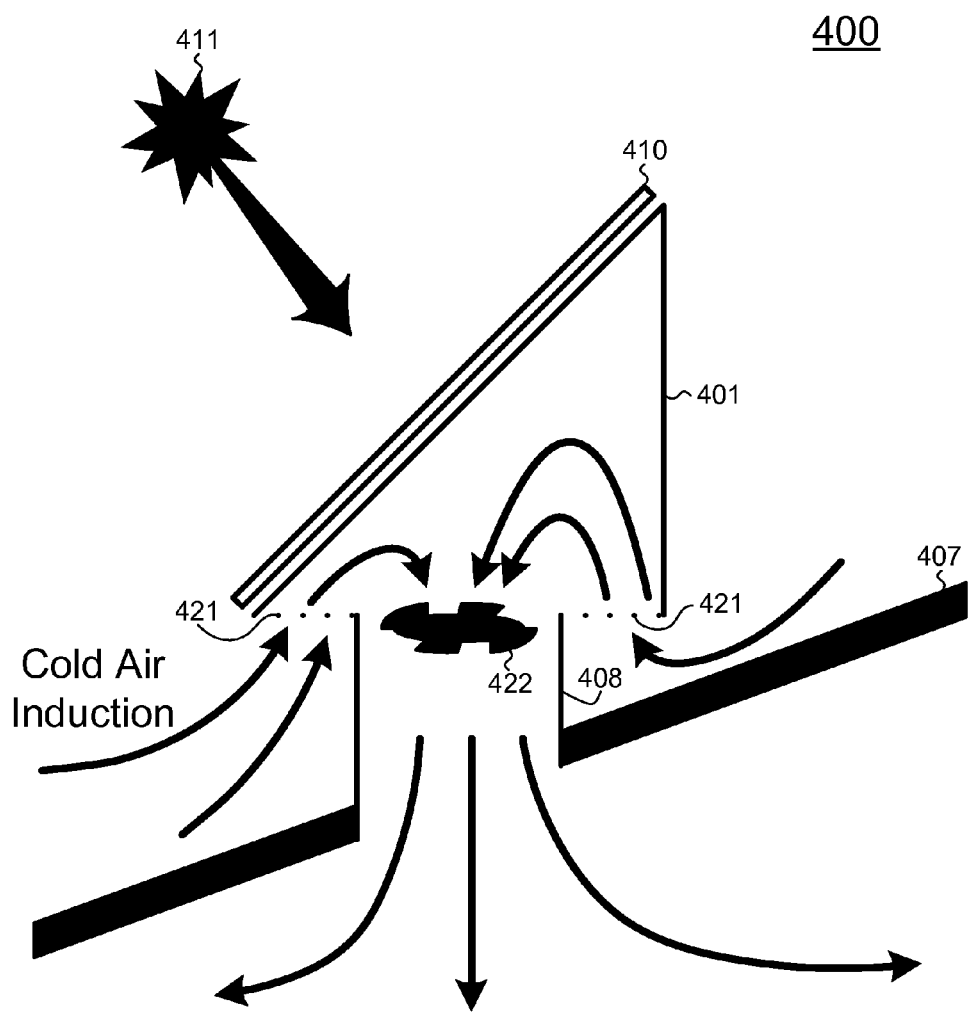
FIG. 4B is a diagram illustrating an air induction cooling operation of embodiments of the invention.

FIG. 4B illustrates a cool air induction operation of the ventilation system 400. In this operation the spinning direction of the fan 422 is opposite that of the fan illustrated in FIG. 4A, which causes air from outside the building to be drawn through the ventilation system 400 and into the building. This operation may be performed at night, when outside air may be cooler than the air inside the building. If the solar panel 410 does not generate enough power to operate the fan 422, stored power from a battery (not illustrated), such as the battery 214 described above, may be used. In another embodiment, the fan 422 does not change directions, but rather a pitch of the blades is changed to effectively reverse airflow.

Figure 5:
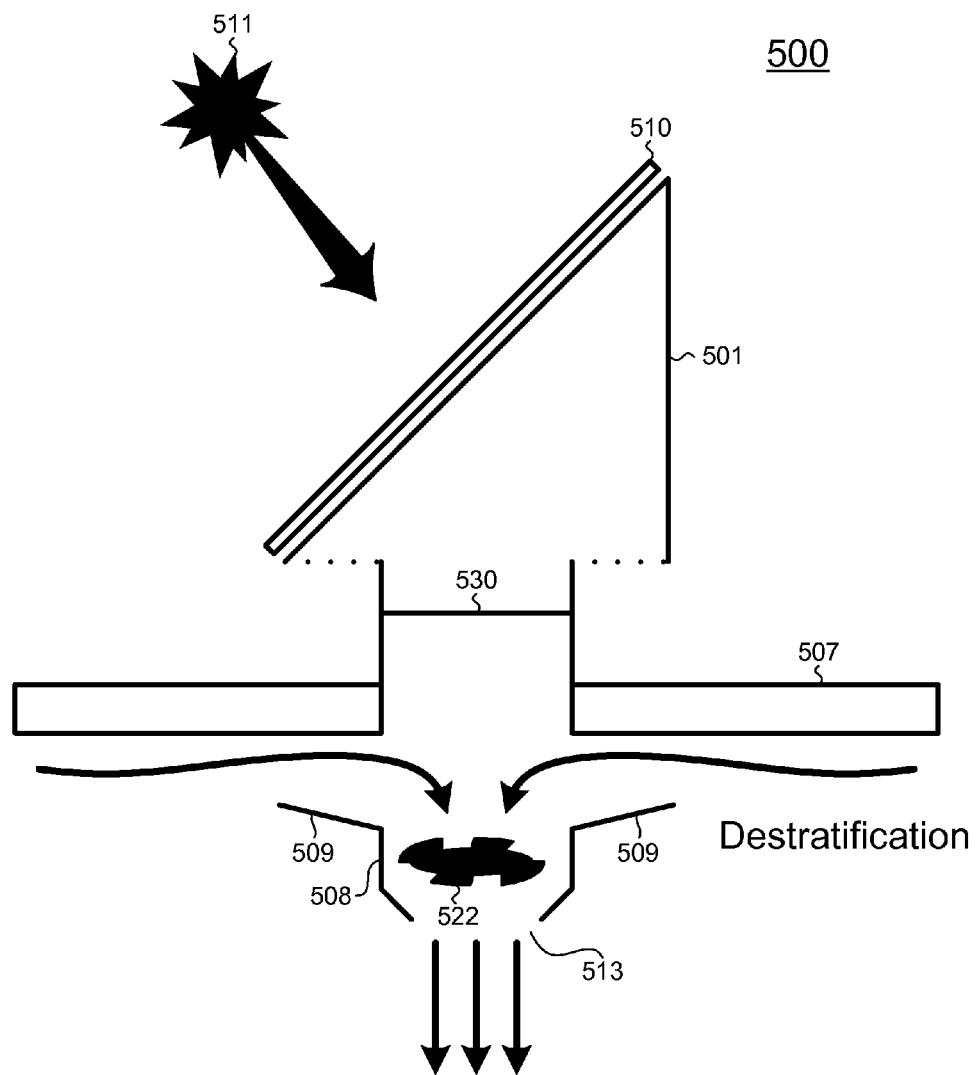
FIG. 5 is a diagram illustrating a destratification operation of embodiments of the invention.

FIG. 5 illustrates a destratification operation possible when using embodiments of the invention. FIG. 5 is similar to FIGS. 4A and 4B above, except for the addition of a set of destratification doors 509 located in a base extension 508 of a ventilation system 500. Additionally, the ventilation system 500 includes a set of baffles or dampers 530. In a typical destratification operation, the dampers 530 are closed to prevent airflow between the inside and outside of a building. The destratification doors 509 are opened, however, which allows for air movement within the building, powered by the ventilation system 500, but simultaneously preventing air exchange between the building and outside air.

Generally, because hot air rises, it will be the hottest air of the building that is closest to the roof-mounted ventilation system 500. The destratification doors 509 are opened into this hottest airspace, which allows the hot air to be drawn through the destratification doors and pushed out through a vent 513 toward the main operating space of the building. For example, in the winter months, heat may accumulate at the ceiling of a building due to the hot air rising. Using the ventilation system 500 in the destratification mode works to thermally balance the air within a building by bringing the hottest air back down into the main operating space, where it may be the most useful. In the summer it may be desired to reverse the operation of the fan 522 from what is illustrated in FIG. 5, and purposely draw the hot air away from the central operating space, and purposely venting it toward the ceiling.

In some embodiments it is possible to perform the destratification operation while the dampers are partially opened, or, depending on the airflow within the ventilation system 500, even fully opened. This allows both a destratification operation as well as a venting operation to take place simultaneously. Recall that the ventilation system 500 may also operate in conjunction with a control system, such as the control system 250. Using a control system the ventilation system 500 may have an automatic operation mode that directs the ventilation system to vent or perform an air exchange during certain times of the day, or based on temperature differentials, and to perform destratification at other times. In sophisticated systems including multiple sensors, the ventilation system 500 may be programmed to operate with autonomy, bringing a maximum cooling, heating, or air movement benefit with a minimum of effort. Because the ventilation system 500 is solar powered, this benefit comes with nearly zero operating cost as there is no ongoing power cost.

Figure 6:
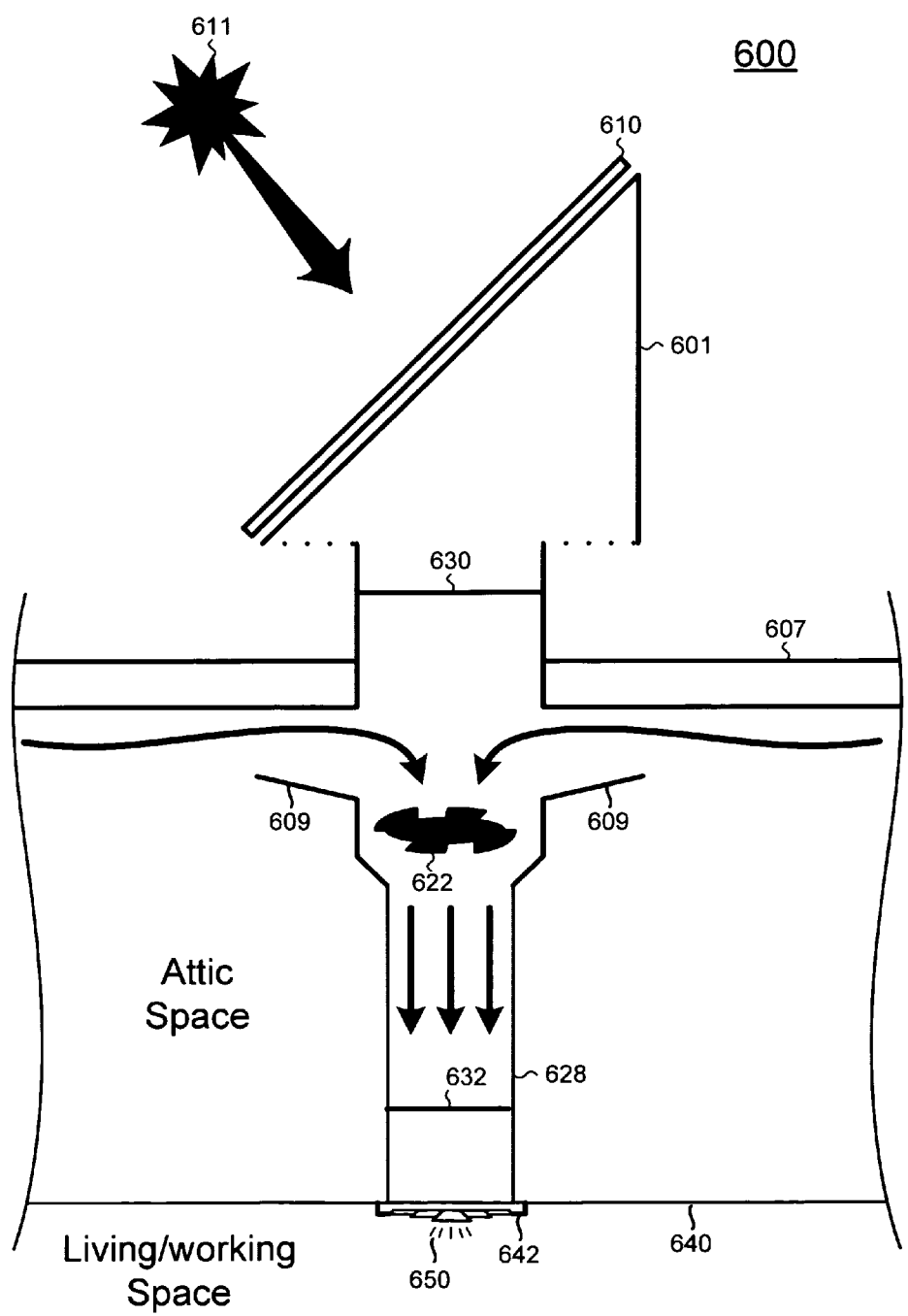
FIG. 6 is a diagram illustrating a destratification operation from a contained space according to embodiments of the invention.

FIG. 6 is another embodiment of the invention that may be used to exchange air from one confined space to another confined space, from a confined space to the outside, or from the outside to either or both confined spaces such as those illustrated. In FIG. 6, attic space is that space defined between a roof 607 and an inside ceiling 640. In general, attic spaces are not conditioned spaces, and, to the contrary, generally are un-conditioned spaces. In winter months solar loading on the roof may cause attic spaces to warm sufficiently such that it would be beneficial for air in the attic space to be moved into the general living/working space, such as below the ceiling 640. The embodiment of the invention illustrated in FIG. 6 uses a set of destratification doors 609 in the open position to pull heat from the attic space and push it into the living or working space below. It does this by pushing air through ductwork 628. In such an operation, a first set of dampers 630 are closed while a second set of dampers 632 are opened. In such a mode, the ventilation system 600 is able to destratify air from one closed space into another closed space, all while powered from a solar device outside.

In another operation, the set of destratification doors 609 may be closed and both dampers 630, 632 are opened, which allows the ventilation system 600 to vent hot air from one conditioned and/or confined space, through another confined space to the outside. Or, conversely, by reversing the fan, the ventilation system 600 may draw air from outside and bring it through a confined space into another confined, and possibly conditioned, living/working space.

The air brought into the living/working space is introduced from or pulled through a register 642. In some embodiments a light 650 may also be mounted on the register 642, and controlled as described above.

Figure 7:
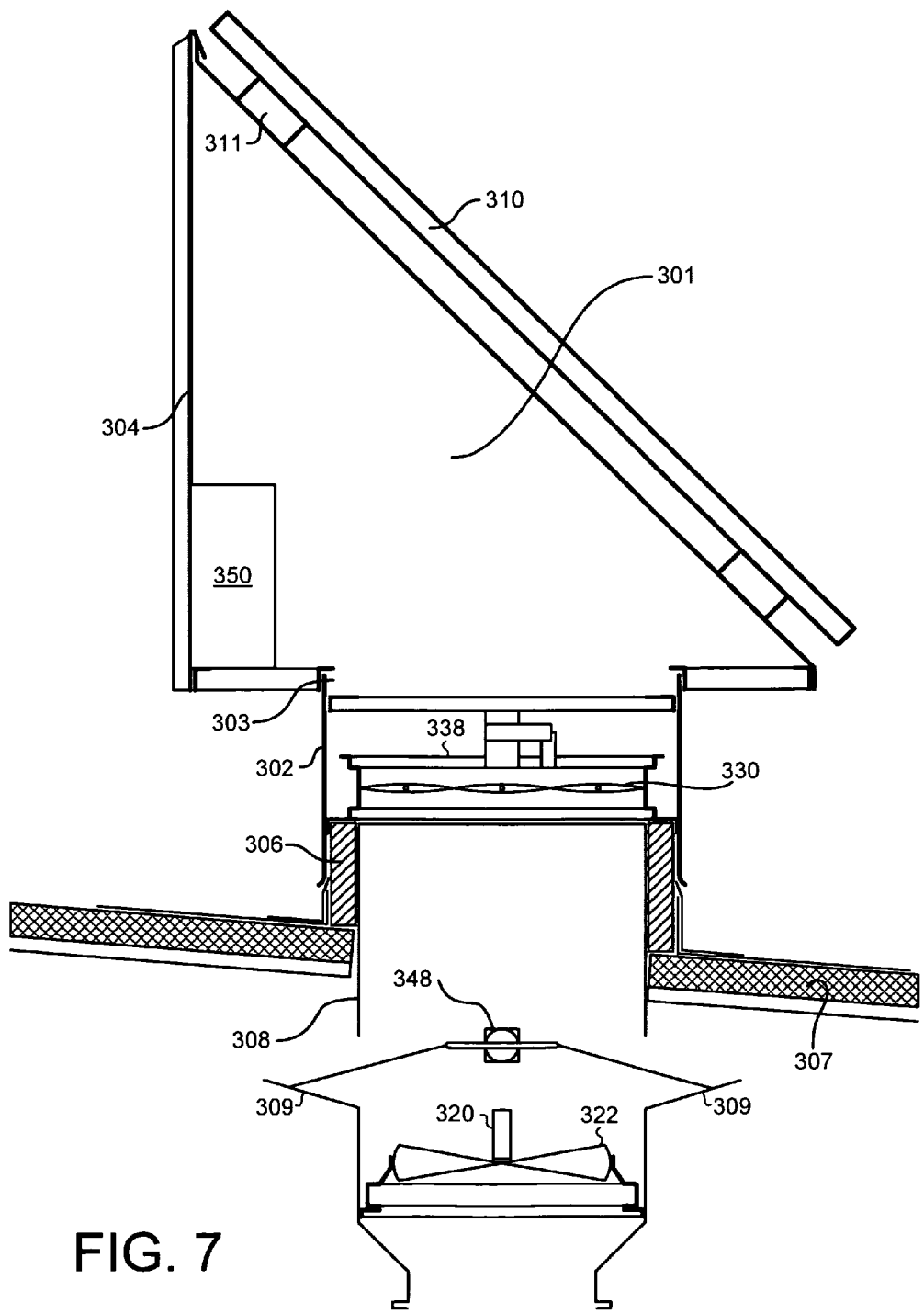
FIG. 7 is another cross-sectional diagram of the ventilation system of FIG. 3 illustrating a destratification operation according to embodiments of the invention.

FIG. 7 is a cross-sectional diagram similar to the diagram of FIG. 3, but illustrating a destratification operation according to embodiments of the invention. In FIG. 7, the set of destratification doors 309 are fully opened and the damper 330 is fully closed. Compare this to the ventilation system 300 of FIG. 3 where the destratification doors 309 are fully closed while the damper 330 is fully open. Thus, the ventilation system 600 of FIG. 6 is set to operate in the destratificaiton mode while the ventilation system 300 of FIG. 3 is set to operate in either the heat venting or cold air induction mode, depending on a direction of the fan. Changing between the modes of FIGS. 3 and 6 involves the damper controller 280 and the destratification controller 284 energizing or otherwise moving control motors or other positioning systems such as the damper actuator 338 and destratification actuator 348 to cause the damper 330 and destratification doors 309 to move into the desired positions, respectively, to perform the desired air movement operation.

Figure 8:
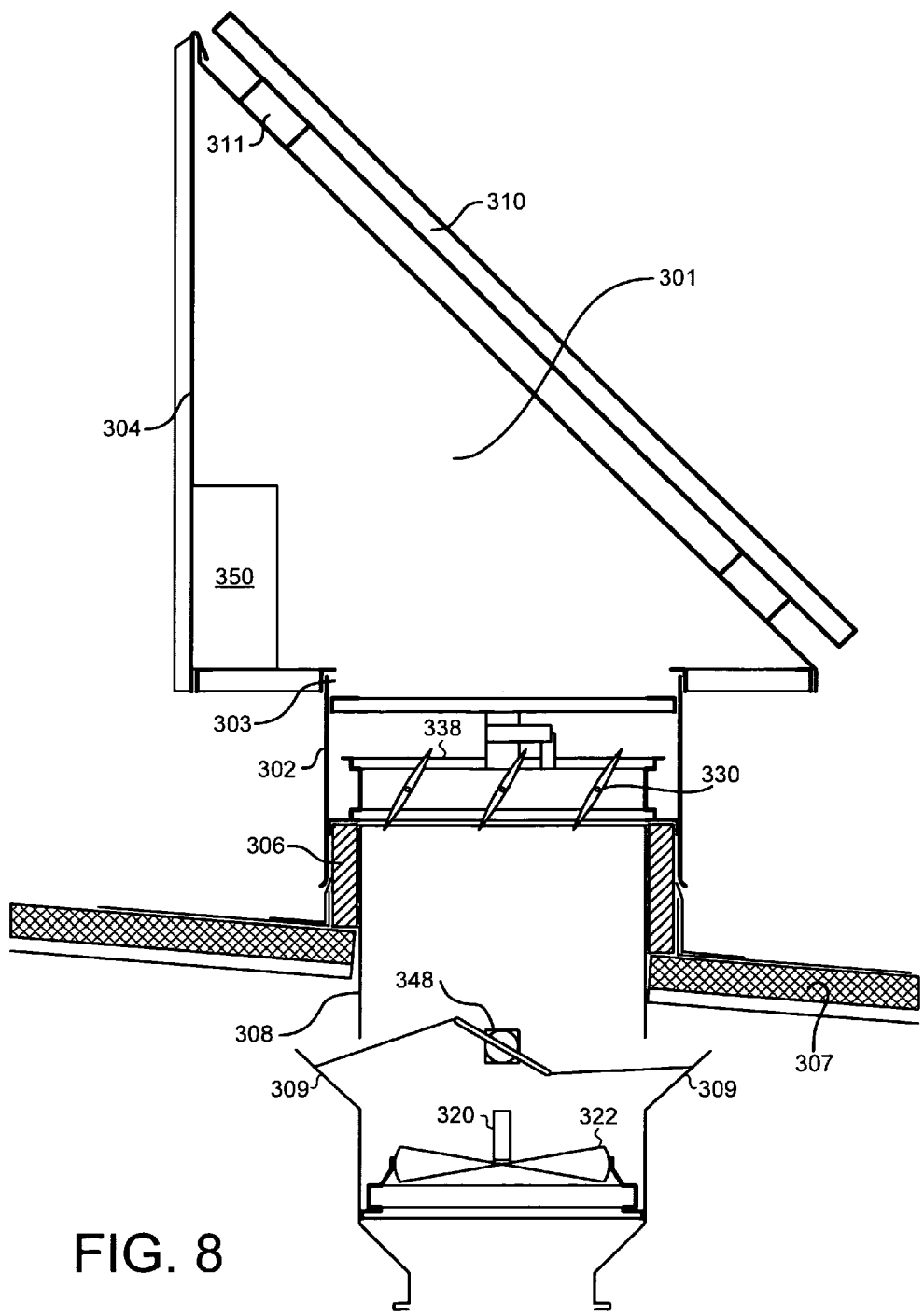
FIG. 8 is yet another cross-sectional diagram of the ventilation system of FIG. 3 illustrating a partial destratification operation according to embodiments of the invention.

FIG. 8 is another cross-sectional diagram similar to the diagram of FIG. 3 that illustrates yet another mode, which is a partial destratification mode. In this mode both the baffles 330 and the destratification doors 309 are partially open. This allows the air within the building to be destratified, as described above, while there is a simultaneous amount of air exchange between the inside and outside of the building through the baffles 330. This mode may be particularly advantageous during transitioning parts of the day, when the temperature differential is not particularly great, but where strata of air layers are becoming more stratified within the building itself. As described above, the control system 250 may be employed to automatically enter the partial destratification mode based on information sensed by sensors 260 and programmatic control.

Figure 9:
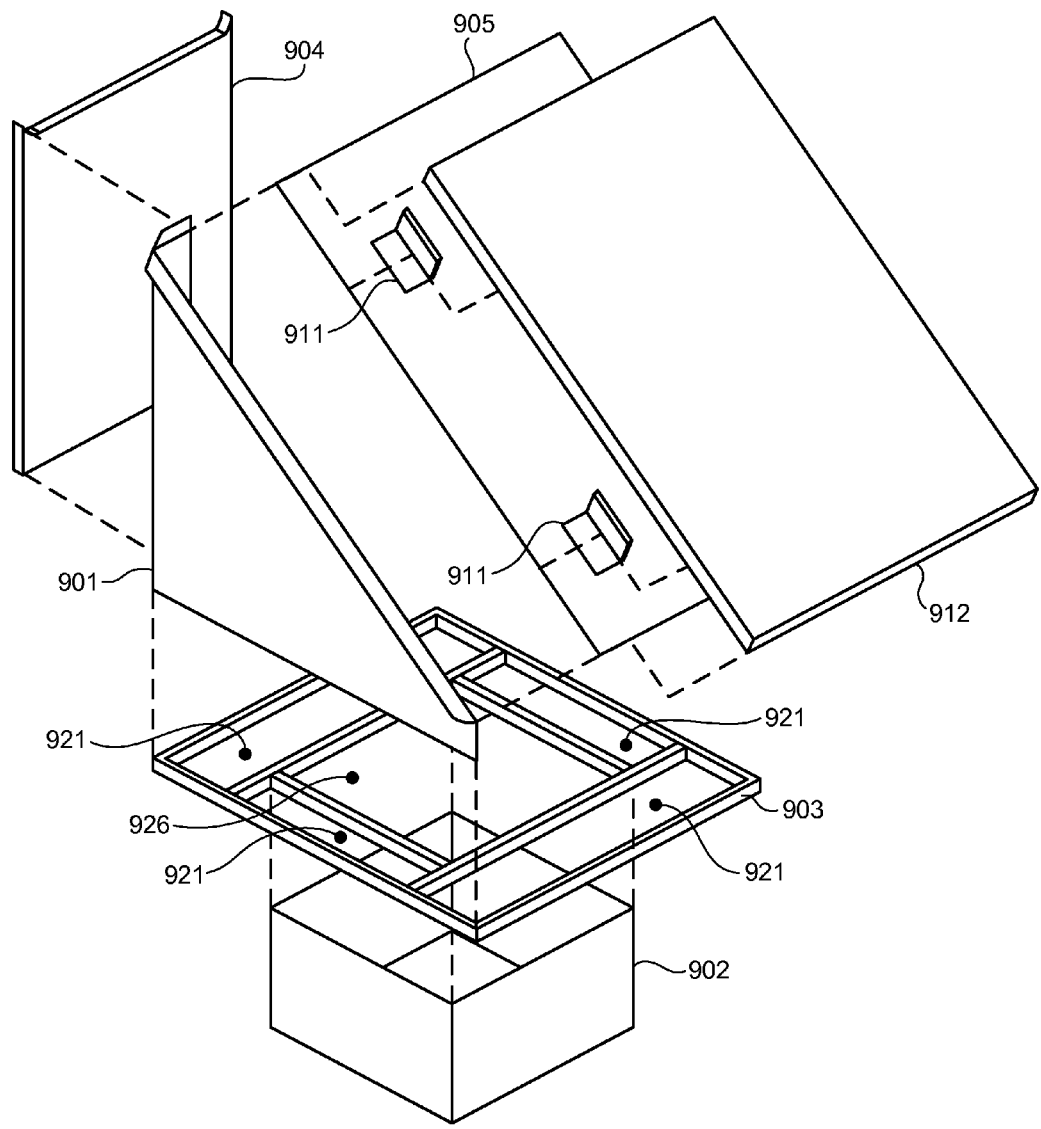
FIG. 9 is an exploded view diagram illustrating components of a ventilation system housing according to embodiments of the invention.

FIG. 9 is an exploded view diagram illustrating components of the plenum 926 and container shell of a ventilation system according to embodiments of the invention. A frame 903 provides support for the system. The base 902 and base extension (not shown), described with reference to FIG. 3, are positioned within a central portion of the frame 903. Surrounding the center portion of the frame are venting areas 921, where air passes through before or after it passes through the base 902 and the base extension (not shown). Mesh, screens, or other coverings may be used in the venting areas 921 to prevent intrusion of pests, such as insects or vermin, for example. In some embodiments filters may be used in conjunction with or in place of screens within the venting areas to provided even more air filtering ability.

The components of the plenum 926 are attached to the outside portions of the frame 903 as illustrated. A vertical wall 904 may be a structural component of the plenum 926, or may operate as an access door to allow access inside. Side panels 901 are self-explanatory, although they may also include access panels to the plenum 926. The angled panel 905 provides a base for attaching the solar panel 912, while one or more brackets 911 secure solar panel 912 to angled panel 905.

In some flush-mounted systems there may not be a body extension. In such a case all of the components of the system would be contained fully within the plenum and body areas.

As described above, it is obvious that embodiments of the invention have application in buildings such as factories, storehouses or warehouses. There is also application in areas such as living and occupied spaces, bathrooms, crawlspaces, attics, fireplaces/chimneys, wall cavities, clean rooms, hospital/medical applications, military applications, mobile crafts, shipping containers, etc.

Although particular embodiments of a ventilation system have been described, it will be appreciated that the principles of the invention are not limited to those embodiments. Variations and modifications may be made without departing from the principles of the invention as set forth in the following claims.

What is claimed is:

1. A self-contained solar-powered ventilation appliance for mounting on a base coupled to a building, the appliance comprising:
   a plenum located outside of the building and coupled to the base;
   a base extension coupled to the base and structured to pass through an opening in a roof of the building and into a confined space of the building, the confined space being below the roof of the building, the plenum and the base extension together creating an air path through the plenum and the base extension;
   a solar panel structured to convert solar energy to electrical power for use by the ventilation appliance;
   a fan motor structured to use the electrical power generated by the solar panel to operate a fan to move air through the air path;
   a set of controllable dampers structured to prevent or allow air from flowing through the air path; and
   at least one destratification unit disposed between the fan and the set of controllable dampers, the destratification unit including a destratification door that opens into the confined space and structured to controllably allow building air from within the confined space to enter the base extension through the destratification door and to exit the base extension back into the confined space through an opening other than the destratification door or to exit the base extension through the destratification door and to enter the base extension back into the confined space through an opening other than the destratification door, wherein the plenum, the base extension, the at least one destratification unit, and the solar panel are mechanically coupled and self-contained.

2. The solar-powered ventilation appliance of claim 1, in which the destratification unit comprises a destratification actuator and the destratification door.

3. The solar-powered ventilation appliance of claim 1, further comprising:
   a control processor structured to control operation of the ventilation appliance.

4. The solar-powered ventilation appliance of claim 3 in which the control processor includes a ventilator interface structured to receive information from at least one other ventilator.

5. The solar-powered ventilation appliance of claim 3 in which the control processor includes an HVAC interface structured to receive information from an HVAC controller.

6. The solar-powered ventilation appliance of claim 1, further comprising a lighting circuit structured to produce light from the electrical power generated by the solar panel.

7. The solar-powered ventilation appliance of claim 6, further comprising a motion sensor, and in which a signal from the motion sensor causes a light to illuminate.

8. The solar-powered ventilation appliance of claim 1, further comprising an air dryer structured to remove humidity from the air.

9. The solar-powered ventilation appliance of claim 1, in which the destratification unit is structured to maintain the destratification door in a partially open position.

10. The self-contained solar-powered ventilation application according to claim 1, wherein the confined space is below an inside ceiling of the building.

11. A self-contained solar-powered ventilation appliance for mounting on a base coupled to a building, the appliance comprising:
    a plenum located outside of the building and coupled to the base;
    a base extension coupled to the base and structured to pass through an opening in a roof of the building and into a confined space of the building, the confined space being below the roof of the building, the plenum and the base extension together creating an air path through the plenum and the base extension;
    a solar panel structured to convert solar energy to electrical power for use by the ventilation appliance;
    a fan motor structured to use the electrical power generated by the solar panel to operate a fan to move air through the air path;
    a set of controllable dampers structured to prevent or allow air from flowing through the air path;
    at least one destratification unit disposed between the fan and the set of controllable dampers, the destratification unit including a destratification door that opens into the confined space and structured to controllably allow building air from within the confined space to enter the base extension through the destratification door and to exit the base extension back into the confined space through an opening other than the destratification door or to exit the base extension through the destratification door and to enter the base extension back into the confined space through an opening other than the destratification door;
    a control processor structured to control operation of the ventilation appliance, the control processor including a ventilator interface structured to receive information from at least one other ventilator; and
    in which the control processor from a first ventilator interface is structured to control operation of the at least one other ventilator wherein the plenum, the base extension, the at least one destratification unit, and the solar panel are mechanically coupled and self-contained.

12. The self-contained solar-powered ventilation application according to claim 11, wherein the confined space is below an inside ceiling of the building.

13. A self-contained solar-powered ventilation appliance for mounting to a building, the appliance comprising:
    a solar panel structured to convert solar energy to electrical power for use by the ventilation appliance;
    an air path having a first end terminating outside a confined space of the building, and having a second end terminating within the confined space of the building, the confined space being below an inside ceiling of the building;
a fan motor structured to use electrical power generated by the solar panel and to operate a fan disposed adjacent to the second end to move air through the air path;
at least one damper structured to prevent or allow air from flowing through the air path; and
a destratification portion disposed between the fan and the at least one damper, the destratification portion including:
 one or more destratification doors that, when in a closed position, prevent air from flowing into the air path, and, when in an open position, allow air to flow from within the building into the air path, and
 a door controller coupled to the one or more destratification doors and structured to control a position of the one or more destratification doors wherein the air path, the destratification portion, and the solar panel are mechanically coupled and self-contained.

14. The self-contained solar-powered ventilation appliance according to claim 13 in which the first end of the air path is coupled to an inside volume of the appliance.

15. The self-contained solar-powered ventilation appliance according to claim 13 in which the destratification doors allow air from the confined space of the building to flow into the air path when the destratification doors are in the open position.

16. The self-contained solar-powered ventilation appliance according to claim 13 in which the destratification doors allow air from attic space of the building to flow into the air path when the destratification doors are in the open position.

* * * * *